3,320,317
QUATERNARY AMMONIUM ADDUCTS OF POLYEPICHLOROHYDRIN

William A. Rogers, Lake Jackson, Tex., and James E. Wochst, Savannah, Ga., assignors to the Dow Chemical Company, Midland, Mich., a corporation of Delaware
No Drawing. Filed July 9, 1963, Ser. No. 293,842
4 Claims. (Cl. 260—567.6)

The present invention is concerned with quaternary adducts of polyepichlorohydrins with tertiary lower alkyl amines.

The novel compounds of the invention are water-soluble polyquaternary amines having molecular weights of from about 600 to about 100,000. These compounds may be represented schematically by the formula:

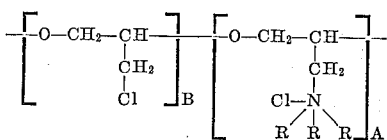

wherein each R representes methyl or ethyl; the sum of A and B is an integer from 4 to about 500; and the ratio of A to B is at least 1:5 and preferably at least 1:2.

Alternatively, the new compounds can be represented as adducts of a tertiary alkyl amine with a polyepichlorohydrin of the formula:

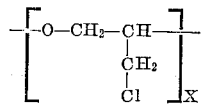

where X is an integer from 4 to about 500. It will be seen that the new compounds may also be named as polyoxyalkylene poly(trialkylammonium)chlorides.

The new compounds have utility as modifiers in epoxy resins and as intermediates for the preparation of more complex compounds. Further, the new compounds have shown unusual activity as flocculating agents particularly effective for improving the sedimentation of sewage solids.

The quaternary adducts of polyepichlorohydrin with tertiary alkyl amines may be prepared by contacting a polyepichlorohydrin with a solution of a tertiary alkyl amine in a suitable solvent at temperatures of from about 50° C. to about 120° C., preferably at a temperature of about 100° C. Good results have been obtained by contacting polyepichlorohydrin with a solution of the desired tertiary alkyl amine in water or alcohol with vigorous agitation at a reaction temperature as set forth above for a period of from about 2 to 8 hours or more. With relatively volatile amines, such as trimethylamine, the reaction is carried out in a closed vessel such as an autoclave and under autogenous pressure. With amines of a higher boiling point, such as triethylamine, the reaction may be carried out at atmospheric pressure under reflux. On completion of the reaction, the quaternary adduct product may be separated by distilling off the solvent and any unreacted amine, preferably under reduced pressure.

The following examples illustrate the invention but are not to be construed as limiting the same.

Example 1

600 grams of polyepichlorohydrin having a molecular weight of about 800, and 225 grams of an aqueous 25 percent by weight solution of trimethylamine, providing a ratio of 0.15 mole of amine per equivalent of chlorine in the polymer, were mixed together in a stainless steel autoclave and heated at a temperature of 100° C. with stirring and under autogenous pressure for about 3.5 hours. On completion of the heating period, the autoclave was vented and heating continued while drawing a vacuum on the reaction vessel to separate volatile constituents such as water and unreacted amine. In this fashion, the pressure was reduced as rapidly as possible to about 5 millimeters of mercury and heating was continued to a final pot temperature of about 150° C. The polyoxyalkylene poly(trimethylammonium)chloride product, obtained as a residue and constituting a quaternary adduct of trimethylamine with polyepichlorohydrin, was a viscous liquid and was readily and completely soluble in water.

Example 2

700 grams of polyepichlorohydrin having a molecular weight of about 1150 and 1000 grams of an aqueous 47 percent solution of trimethylamine were placed in a stainless steel autoclave and heated with agitation and under autogenous pressure at a temperature of 120° C. for 3 hours. On completion of the reaction, volatile constituents of the reaction mixture were removed by flash distillation under reduced pressure at temperatures of from 100 to 150° C. as in Example 1. The quaternary adduct of trimethylamine with polyepichlorohydrin was obtained as a residue and was a viscous liquid, completely soluble in water. The product was analyzed and found to contain 5.17 percent by weight of nitrogen representing a substitution of trimethylammonium chloride for chlorine on the polyepichlorohydrin to the extent of about 56 percent of the available chlorine atoms originally in the polymer chain.

Example 3

Following the general procedure of Example 1, further quaternary adducts were prepared employing various ratios of trimethylamine and polyepichlorohydrin and various molecular weights of the latter. The trimethylamine was added in the form of an aqueous 25 percent by weight solution thereof. Each of the products so obtained was a viscous liquid completely soluble in water. Representative ratios of reactants, molecular weights and reaction conditions are summarized in the following table, wherein parts are by weight and "PECH" stands for polyepichlorohydrin.

| Adduct Number | 3 | 4 | 5 | 6 | 7 |
|---|---|---|---|---|---|
| Molecular Weight of PECH | 1,200 | 1,500 | 500 | 800 | 1,150 |
| Parts of PECH employed | 200 | 200 | 200 | 180 | 400 |
| Parts Trimethylamine employed | 116 | 110 | 109 | 100 | 212 |
| Parts Water employed | 350 | 330 | 327 | 300 | 638 |
| Temperature of Reaction, ° C | 100 | 100 | 100 | 120 | 120 |
| Heating time, hours | 8 | 9 | 17 | 8 | 3 |
| Moles of Amine per Equivalent of Chlorohydrin | 0.92 | 0.86 | 0.86 | 0.87 | 0.83 |

Example 4

Following the general procedure of Example 1, two molar proportions (202 parts by weight) of triethylamine were dissolved in about 600 parts by weight of water and mixed with 500 parts by weight of polyepichlorohydrin having a molecular weight of about 500. Said mixture was placed in a stainless steel autoclave and heated at a temperature of about 100° C. for a period of 9 hours under autogenous pressure. On completion of the heating, the pressure was released and a vacuum drawn on the autoclave down to a final pressure of about 5 millimeters of mercury while heating to a final pot temperature of about 150° C. The desired quaternary adduct of triethylamine with polyepichlorohydrin was obtained as a viscous, oily liquid readily soluble in water.

*Example 5*

Raw sewage was obtained from the influent of a sewage treatment plant. The sewage was thoroughly mixed and divided into 500 milliliter portions. Each such portion was stirred with a paddle agitator operating at 40 revolutions per minute and sufficient of a bentonitic clay was added to provide 50 parts by weight of clay per million parts of sewage. Test chemicals were added to some of the portions and agitation continued for 10 minutes after the addition to allow any flocculated material to grow in size. The agitators were then removed and the suspended solids in the sewage allowed to settle for 5 minutes. Thereafter, a sample of the supernatant fluid from each vessel was taken and the turbidity thereof determined on a Fischer Nefluoro-Photometer (Model 460). An untreated sample of the same sewage was subjected to the same agitation and sedimentation and the supernatant fluid from said untreated sample was used to calibrate the photometer. The instrument was set to read for 100 percent turbidity for the supernatant from the untreated sample. Adducts numbers 4, 5 and 6 from Example 3 were added to portions of the sewage in the above-described manner at a treatment level as indicated in the following table. The clarity of the supernatant liquid in terms of the raw sewage (taken as 100 percent) is set forth in the table wherein p.p.m. stands for parts by weight of adduct per million parts of total sewage.

| Adduct Number | Amount of Adduct, p.p.m. | Clarity Reading, percent |
|---|---|---|
| 5 | 1.43 | 42 |
| 6 | 1.45 | 54 |
| 4 | 1.47 | 28 |
| 4 | 4.9 | 18 |

It should be noted that the lower the clarity reading, the more clear the supernatant liquid. For comparison, distilled water produced readings of from 0 to 4 percent and filtration of the raw sewage through a Whatman #42 filter paper and of the filtrate therefrom through a fine fritted-glass filter produced a final filtrate giving a reading of 50 percent.

Similar good results as regards clarification of raw sewage pretreated with clay were obtained when the triethylaminepolyepichlorohydrin adduct of Example 4 was employed in place of the trimethylamine adducts of the preceding example at a treatment rate of 5 parts by weight per million parts of raw sewage.

Active polyquaternary adducts were likewise obtained when the trialkylamine was added to the polyepichlorohydrin in the form of a 25 percent solution in alcohol and the reaction carried out in the latter solvent rather than in water. Alternatively, particularly for the higher molecular weight polyepichlorohydrins, it is sometimes desirable to dissolve the polyepichlorohydrin in a minimum amount of a water-miscible organic solvent such as dioxane or alcohol and to add the resulting solution to an aqueous or alcoholic solution of the trialkylamine reactant. The use of a reaction solvent appears to be necessary for accomplishing a desirable degree of substitution of quaternary groups on the polymer, since attempts to react the polyepichlorohydrin with trialkylamines under anhydrous or substantially anhydrous conditions produced a product having an insufficient content of quaternary ammonium groups to render the same water-soluble.

The proportions of tertiary amine and polyepichlorohydrin employed to produce the adducts of the invention may be varied widely provided sufficient quaternary ammonium groups are introduced into the adduct to render the latter water-soluble. Good results have been obtained when employing from about 0.15 to 2 or more moles of amine per equivalent chlorine in the polyepichlorohydrin to introduce at least about one quaternary ammonium group for each 6 chlorohydrin moieties in the original polymer. Any excess unreacted amine remaining when the reaction is terminated may be recovered from the reaction mixture by distillation.

We claim:
1. A water-soluble adduct of a trialkylamine with polyepichlorohydrin characterized by the formula:

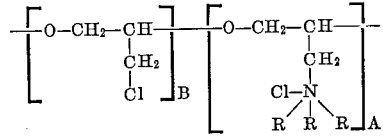

wherein each R is selected from the group consisting of methyl and ethyl; A and B are integers whose sum is an integer of from 4 to about 500; and the ratio of A to B is at least about 1:5.

2. A water-soluble adduct of a tertiary alkylamine with a polyepichlorohydrin of the formula:

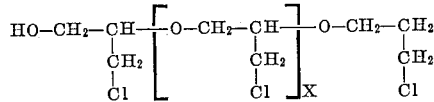

wherein X is an integer from 2 to about 500, the alkyl groups on said tertiary alkylamine being selected from the group consisting of methyl and ethyl, said adduct containing at least one quaternary ammonium substituent for each six chlorohydrin units in the starting polymer.

3. An adduct in accordance with claim 2 wherein the trialkylamine is trimethylamine.

4. An adduct in accordance with claim 2 wherein the trialkylamine is triethylamine.

References Cited by the Examiner

UNITED STATES PATENTS 2,876,217  3/1959  Paschall.

OTHER REFERENCES

Hansson, C.A., vol. 49, pp. 4387–4388 (1955).
Smith et al., C.A., vol. 41, pp. 6358–6459 (1957).
Yamamoto et al., C.A., vol. 58, p. 10410f (1963).

CHARLES B. PARKER, *Primary Examiner.*

JOSEPH P. BRUST, *Examiner.*

FLOYD D. HIGEL, ROBERT V. HINES,
*Assistant Examiners.*

Disclaimer

3,320,317.—*William A. Rogers*, Lake Jackson, Tex., and *James E. Woehst*, Savannah, Ga. QUATERNARY AMMONIUM ADDUCTS OF POLYEPICHLOROHYDRIN. Patent dated May 16, 1967. Disclaimer filed Dec. 22, 1972, by the assignee, *The Dow Chemical Company*.

Hereby enters this disclaimer to claims 1–4 of said patent.

[*Official Gazette May 1, 1973.*]